April 5, 1932.  W. A. BOHNE  1,852,915
AUTOMATIC LATHE
Filed April 1, 1931   11 Sheets-Sheet 1

Fig. 1.

Inventor:-
William A. Bohne,
by his Attorneys,
Howson & Howson

April 5, 1932.  W. A. BOHNE  1,852,915
AUTOMATIC LATHE
Filed April 1, 1931   11 Sheets-Sheet 4

April 5, 1932.  W. A. BOHNE  1,852,915
AUTOMATIC LATHE
Filed April 1, 1931  11 Sheets-Sheet 6

Fig. 6.

Inventor:-
William A. Bohne,
by his Attorneys,
Howson & Howson

April 5, 1932.  W. A. BOHNE  1,852,915
AUTOMATIC LATHE
Filed April 1, 1931  11 Sheets-Sheet 7

Inventor:-
William A. Bohne,
by his Attorneys,
Howson & Howson

Patented Apr. 5, 1932

1,852,915

UNITED STATES PATENT OFFICE

WILLIAM A. BOHNE, OF PHILADELPHIA, PENNSYLVANIA, ASSIGNOR TO E. F. HOUGHTON & COMPANY, OF PHILADELPHIA, PENNSYLVANIA, A CORPORATION OF PENNSYLVANIA

AUTOMATIC LATHE

Application filed April 1, 1931. Serial No. 526,969.

This invention relates to an automatic lathe, and more particularly to an automatic lathe for use in trimming and punching cup packings.

An important object of the invention is the production of a lathe for this purpose whereby after a single setting operation the operation for any given size of cup washer is entirely automatic, both as to the trimming and punching of the packing thereby enabling these operations to be performed by relatively unskilled labor, reducing the amount of labor necessary to the operations and promoting the quality of the product in that the bevel formed in trimming the cup packing is uniform in all packings of the same type, something altogether impossible where these packings are trimmed by hand.

A further object of the invention is the production of a machine of this character which may be relatively cheaply manufactured, which will be simple and durable in its construction, efficient in operation and a general improvement in the art.

These and other objects I attain by the construction shown in the accompanying drawings wherein, for the purpose of illustration, I have shown a preferred embodiment of my invention and wherein:

Figure 19:
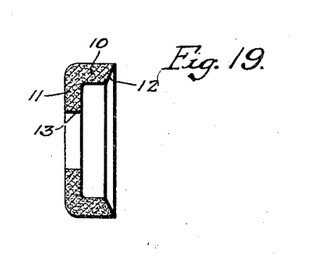
Fig. 19 is a sectional view through a cup packing of the type punched and trimmed by the lathe.

As is well known to those familiar with the art and as clearly shown in Fig. 19, cup packings have relatively straight side walls 10 and a substantially flat inner end wall 11. The ends of the side walls are bevelled as indicated at 12 to form a thin lip at the outer edge of the side wall which is relatively flexible and will afford a seal upon initial installation of the packing and before it has softened so that the entire wall thereof becomes flexible. Such packings are likewise formed with a central opening 13 in the end wall 11 permitting passage of anchoring devices by means of which the packing is held in its applied position. In accordance with my invention, the lathe embodies a bed 14 supporting a head stock 15 embodying a rotatable chuck 16, an ejector mechanism 17 for ejecting cup packings from the chuck 16, a cutting mechanism 18 for trimming the end walls of the washers to produce the bevel thereon and a mechanism generally designated at 19 for placing the cup packings in the chuck 16 and for cutting or punching the central opening in the end wall of the washer. The operation of each of the mechanisms 17, 18 and 19 is controlled by fluid pressure, as hereinafter more fully explained, and the lathe, accordingly, likewise incorporates a fluid pressure control mechanism generally designated at 20 and further incorporates a control mechanism 21 insuring against institution of operation of the remaining mechanisms until the pneumatic control mechanism is so positioned that the first step of the series of operations to be performed is in order.

Referring now more particularly to Figs. 1, 2, 4 and 5, the numeral 22 designates a bracket, projecting from the head stock end of the bed 14, supporting a cylinder 23 and a slide guide 24. The cylinder has mounted therein a ram-type piston 25, the shank of which projects through one end of the cylinder, which is open, and is secured to a slide 26 operating in the slide guide 24. The cylinder 23 and slide guide 24 have opposed ears 27 receiving the ends of a screw 28 having mounted thereon spaced pairs of stop and lock nuts 29 and 30. The slide 26 comprises an ear 31 slidably engaging the screw 28 and adapted to alternately engage the stop nuts 29. Adjustment of these stop nuts will obviously regulate the throw of the ram 25 in both extension and retraction.

Figure 1:
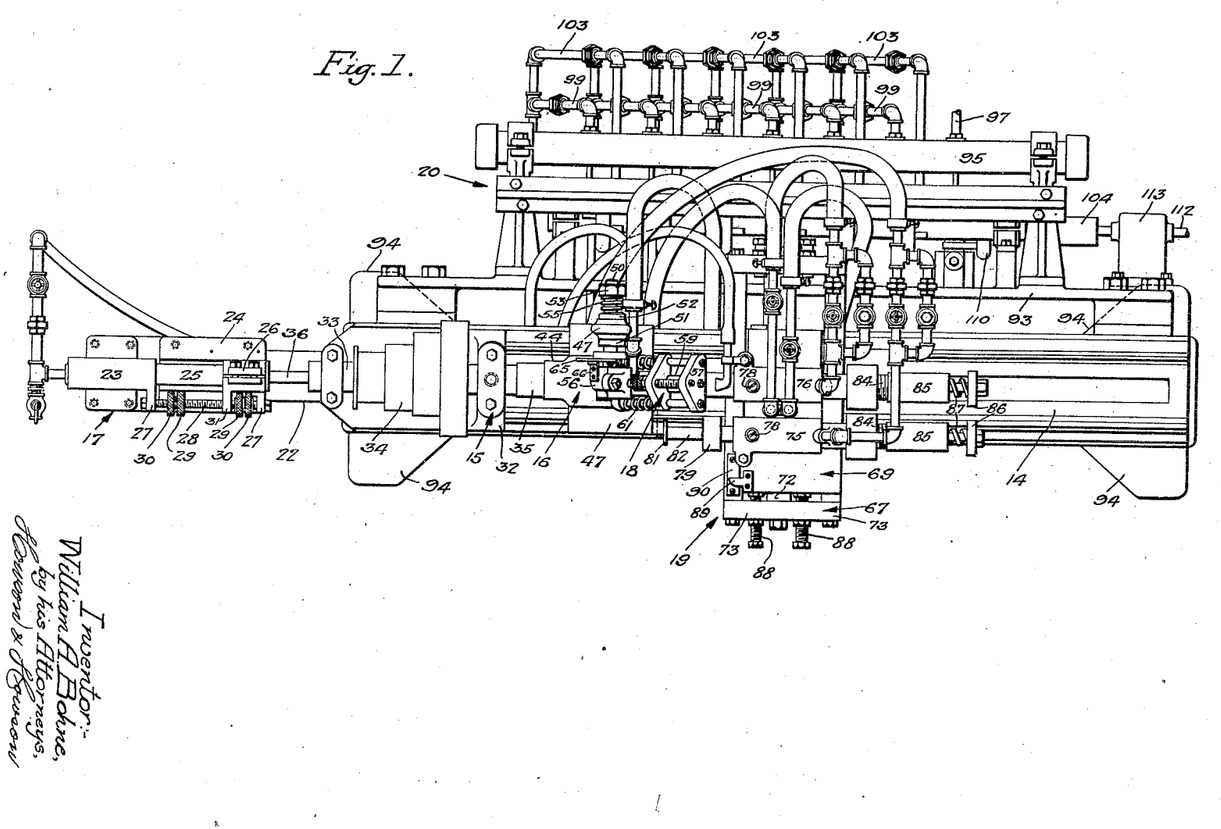
Fig. 1 is a plan view of an automatic lathe constructed in accordance with my invention.
Figure 2:
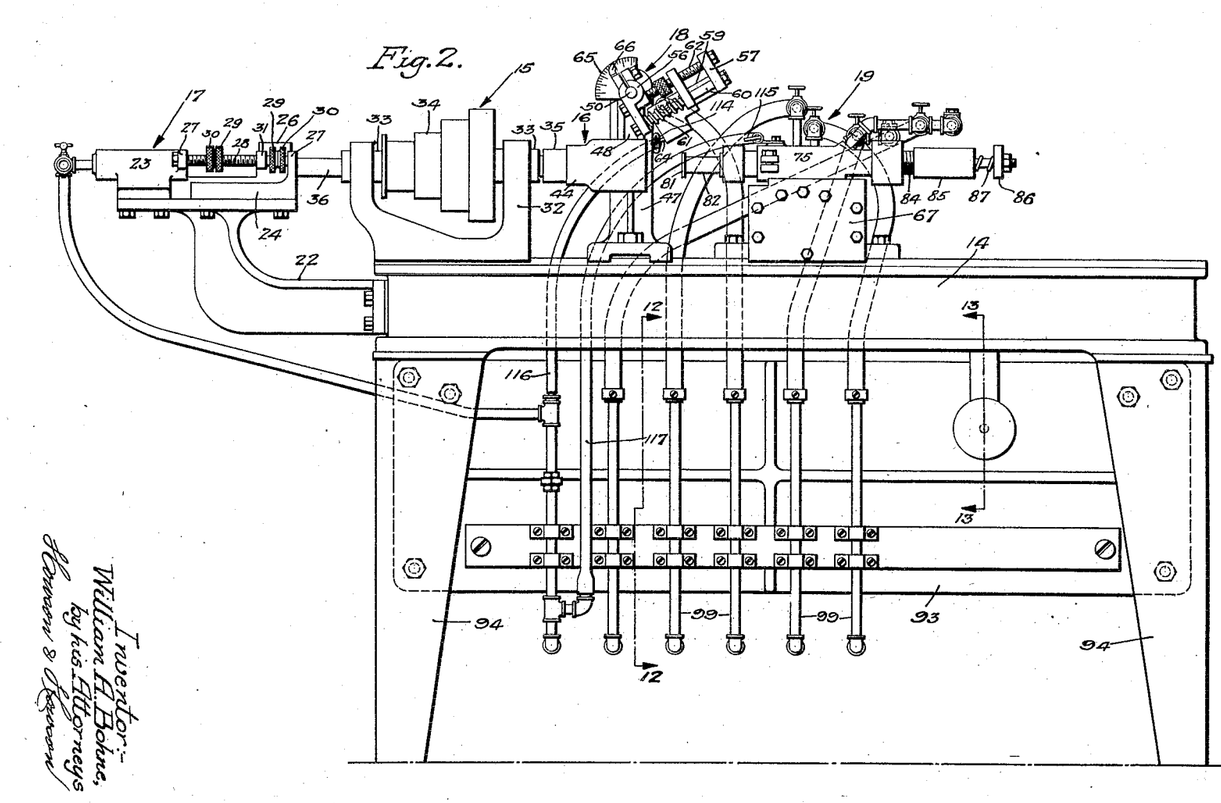
Fig. 2 is a front elevation thereof.
Figure 3:
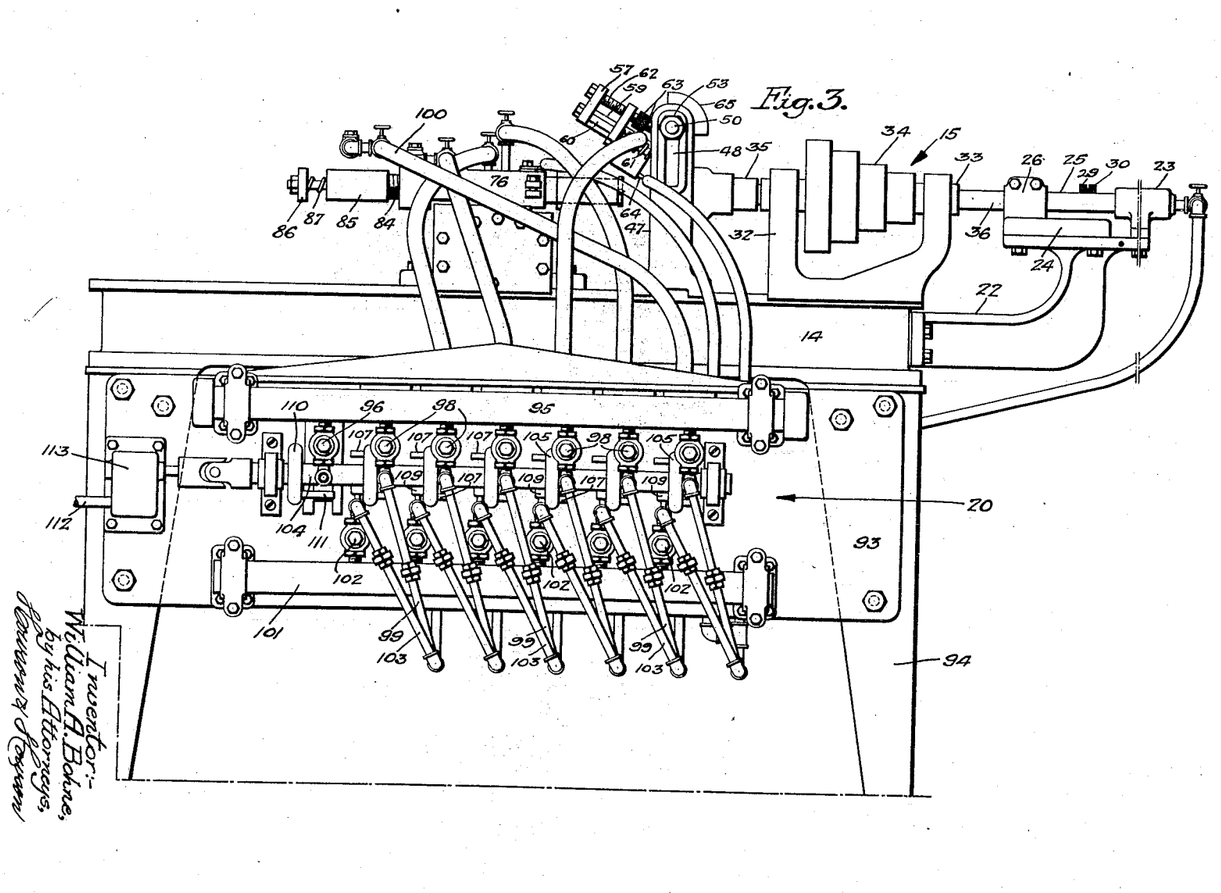
Fig. 3 is a rear elevation thereof.
Figure 4:
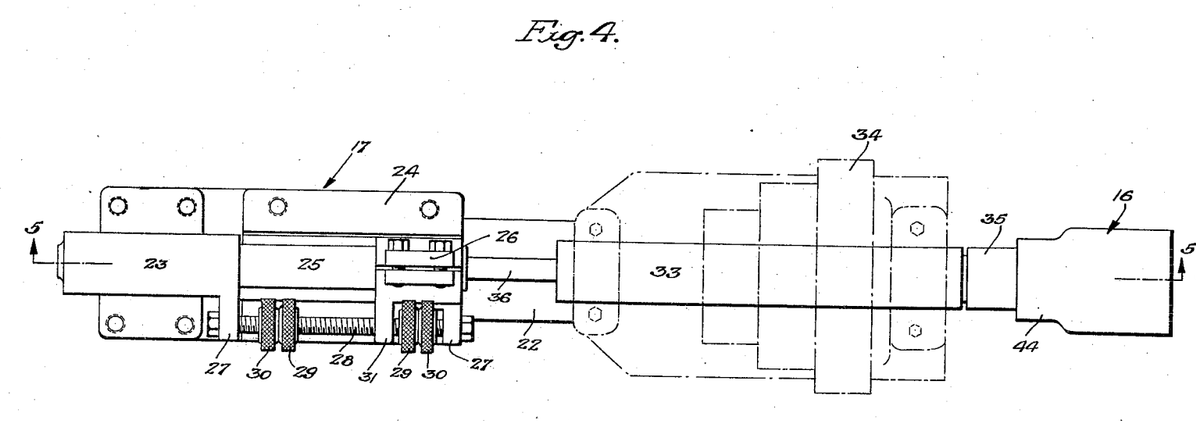
Fig. 4 is an enlarged plan view of the head stock and the associated mechanism.
Figure 5:
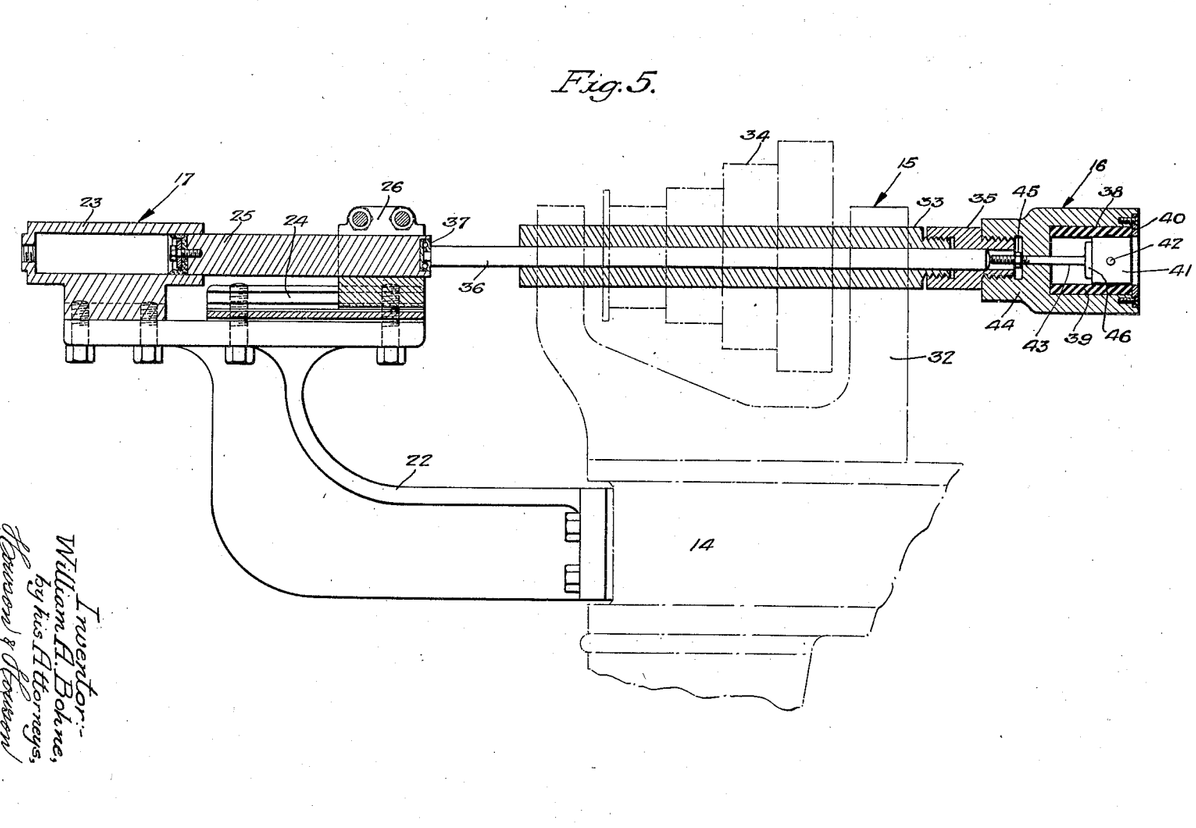
Fig. 5 is a section on line 5—5 of Fig. 4.

The head stock 15 includes a standard 32 which may be of the usual character, and has mounted in bearings afforded thereby a hollow shaft 33 having means whereby it may be rotatably driven, shown in the present instance as a step pulley 34. The inner end of the shaft 33 is connected to the chuck 16 through a suitable connector 35 which is likewise hollow so that an ejector bar 36 may be passed therethrough. The ejector bar 36 at its outer end engages a thrust bearing 37 in the inner end of the ram. Chuck 16, which is made of a size dependent upon the type of cup packing which is to be handled, comprises a socket having a bore 38 lined with a yieldable friction material 39 in the form of an inserted sleeve held in position in the socket by a retaining washer 40 disposed at the outer end of the socket and having a diameter slightly greater than the external diameter of the cup packing. Slidable in the bore is a plug 41 frictionally engaging the friction material 39 and preferably having increased frictional engagement afforded by the presence on the exterior of the plug of a protuberance 42. A tappet 43 extends through the inner end wall 44 of the chuck and is adapted to engage the ejector rod 36 at its outer end. A nut, or other suitable stop 45 co-acting with the end wall limits the projection of the tappet, which may be had by engagement of the ejector rod therewith, and a head 46 on this tappet directly engages plug 41.

Referring now more particularly to Figs. 1, 2, 3, and 15 to 18 inclusive; the cutting mechanism 18 comprises a standard 47 longitudinally adjustable upon the bed 14 and having a vertical slot 48 receiving a squared portion 49 of a horizontally disposed shaft 50, this shaft having an integral collar 51 engaging against one face of the standard and a washer 52 engaging the opposite face thereof. Through a nut 53 and a spacing sleeve 54 the collar 51 and washer 52 are caused to clampingly engage the standard and maintain the shaft in vertically adjusted positions. A spring 55 serves both as a means for impeding loosening of nut 53 and as a means for maintaining the shaft in position in event the nut 53 becomes loosened. Mounted upon the forward end of shaft 50 is a clamping yoke 56 mounting 3 parallel guide rods through which a plate 57 is secured in spaced relation to the yoke 56. Slidably mounted upon these guide rods is a cylinder 58 having a ram-type piston 59 mounted therein, the outer end of which is secured to the plate 57. Two of the guide rods, indicated at 60, are surrounded by springs 61 which extend between the yoke 56 and the mounting ears of cylinder 58. The third guide rod, indicated at 62, is threaded and has mounted thereon stop and lock nuts, as indicated at 63, these stop and lock nuts serving as an adjustable limit for movement of the cylinder 58 toward the yoke 56. Cylinder 58 supports a cutting knife 64 for cutting the bevel on the cup packing. In order that the angle of the bevel may be readily determined, I secure to the shaft 50 an index segment 65 which is suitably graduated, and upon the yoke 56 I mount an index finger 66 for co-action with the index. By simply loosening the yoke and rotating it upon the shaft, any desired angle of the cutting knife to the axis of the chuck may be obtained.

Referring now more particularly to Figs. 1, 2 and 7 to 11 inclusive, the numeral 67 indicates a support having transverse slideways 68 slidably receiving a super-structure 69. This super-structure 69 embodies a pair of transversely-extending cylinders 70 and 71, each having their outer ends open and having mounted therein a ram-type piston 72, the outer end of which is secured to an upstanding end wall 73 or 74 for the support 67. This super-structure further includes a pair of cylinders 75 and 76 which are directed longitudinally of the bed and have the ends thereof, opposing the chuck, open. Mounted in these cylinders are ram-type pistons 77 which are suitably held against rotation as indicated at 78.

The exposed ends of the rams of cylinders 75 and 76 mount respectively a rotatable chucking implement 79 and a cutter holder 80. The chucking implement employed depends upon the size of cup packing which is being produced, the outer end of this implement having a head 81 connected to the body of the chucking device by a reduced neck 82 for a purpose presently to appear. The head 81 is of a size to fit within the cup packing sufficiently snugly to hold a packing when applied in position thereon by the hand, and against any vibration occurring during transfer movements hereinafter described, but insufficient to cause the withdrawal of the cup packing from the friction material of the chuck once the cup packing is engaged thereby.

Each ram has connected thereto a rod 83 projecting through the closed end of the cylinder and through a threaded sleeve 84 carried by this end of the cylinder. Each threaded sleeve has mounted thereon a stop sleeve 85 and the outer end of the rod 83 has secured thereto a member 86 to engage against the stop sleeve 85 and thus limit movement of the associated ram. Between the stop member 86 and the outer end of sleeve 84 a coil spring 87 seated against these elements surrounds the rod 83.

The end wall 73 of support 67 has extended therethrough adjustable stop screws 88 adapted to engage against the confronting end of the super-structure 69 and limit movement of the super-structure under the influence of fluid pressure in cylinder 71. The corresponding end of the super-structure 69 has secured thereto an index finger 89 co-acting with an index 90 carried by one of the side walls of the support 67. When the super-structure is in engagement with the stop screws 88 the ram of cylinder 76 is in alignment with the chuck and the co-action of the index finger 89 with the index 90 indicates the tansverse displacement of the cutter 91 carried by this ram with respect to the axis of the chuck and, accordingly, indicates the size of the opening which will be produced by engagement of the cutter. The opposite end wall 74 likewise mounts stop screws 92, these stop screws limiting movement of the super-structure under influence of fluid pressure in cylinder 70 and being made adjustable so that accurate alignment of the ram of cylinder 75 with the chuck may be had.

Referring now more particularly to the Figs. 1, 2, 3, 6 and 12; the numeral 93 designates a mounting panel disposed at the rear of the machine and at present shown as secured to the supports 94 for bed 14. Supported from this panel adjacent the upper end thereof is a supply manifold 95 having in communication therewith a supply valve 96, controlling communication between the manifold and a suitable source of fluid under pressure indicated by the supply pipe 97, and a series of throttle valves 98 each having its outlet in communication with one of the cylinders of the various implements, hereinbefore described, through a conduit 99. The conduits in those implements which are movable with respect to the bed each incorporate a flexible section 100 disposed adjacent the cylinder so that adjustments or movements of the associated implements may be had. The panel 93 further mounts an exhaust manifold 101 having in communication therewith the outlets of exhaust valves 102 corresponding in number to the valves 98 and each having its inlet in communication with the conduit 99 of the associated intake valve through a conduit 103.

Figure 6:
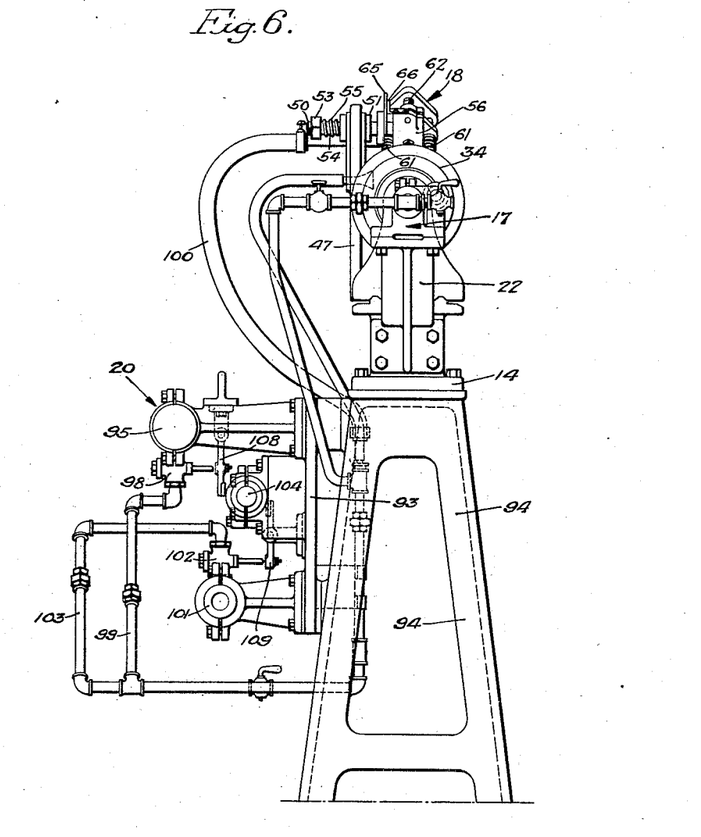
Fig. 6 is an end elevation of the lathe.
Figure 7:
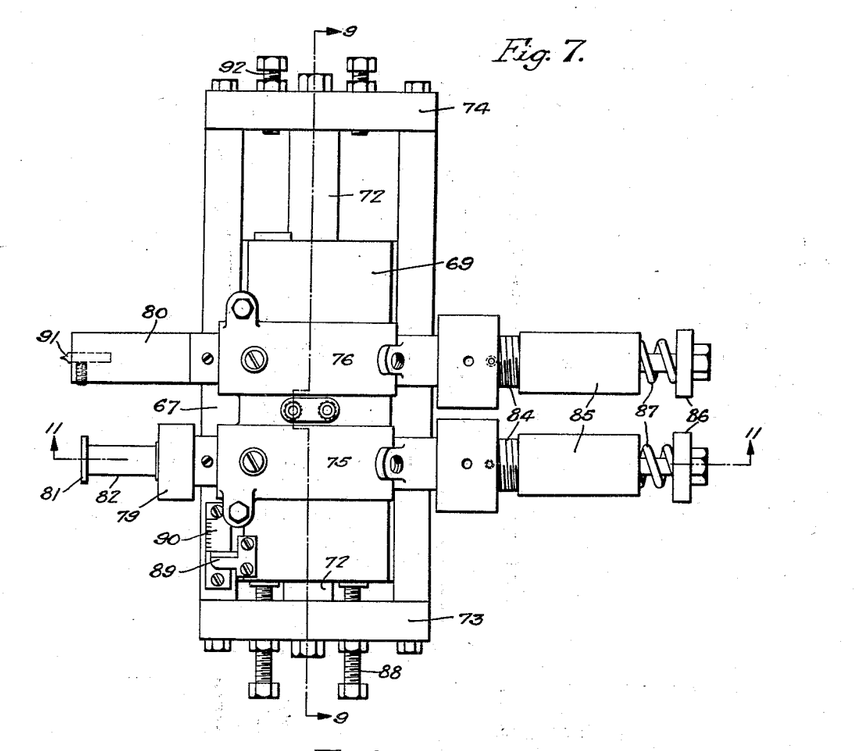
Fig. 7 is a plan view of the inserting and punching mechanism.
Figure 8:
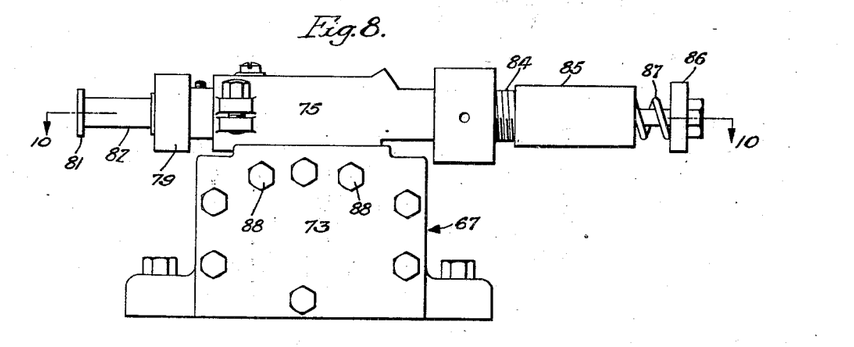
Fig. 8 is a front elevation thereof.
Figure 9:
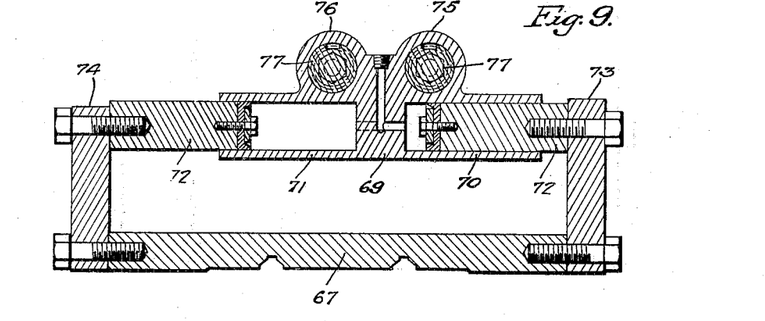
Fig. 9 is a section on line 9—9 of Fig. 7.
Figure 10:
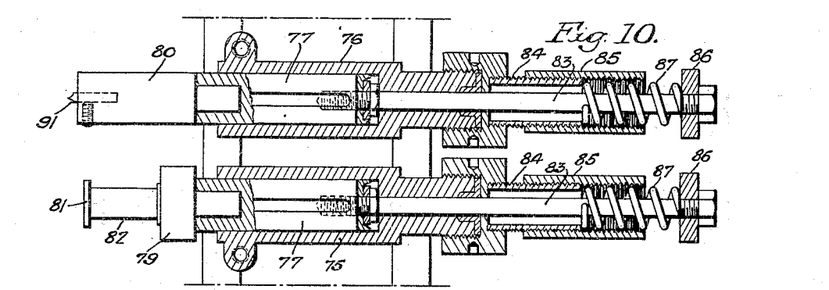
Fig. 10 is a section on line 10—10 of Fig. 8.
Figure 11:
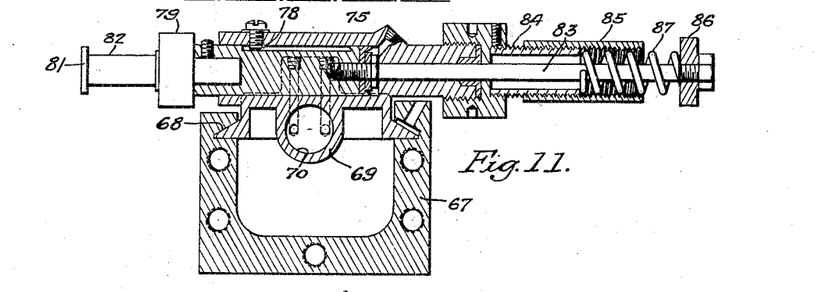
Fig. 11 is a section on line 11—11 of Fig. 7.
Figure 12:
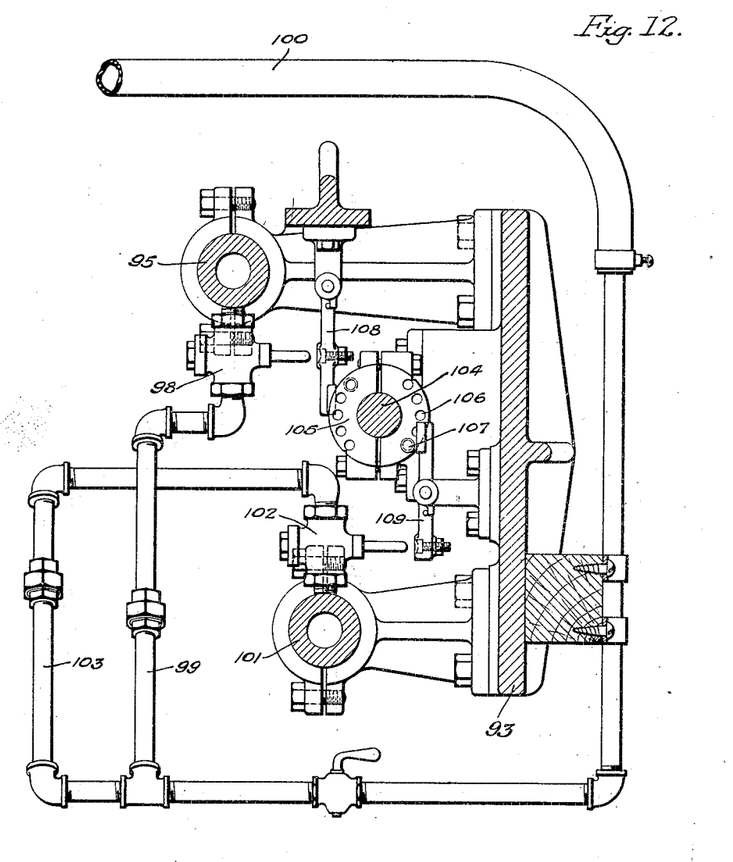
Fig. 12 is a section on line 12—12 of Fig. 2.
Figure 13:
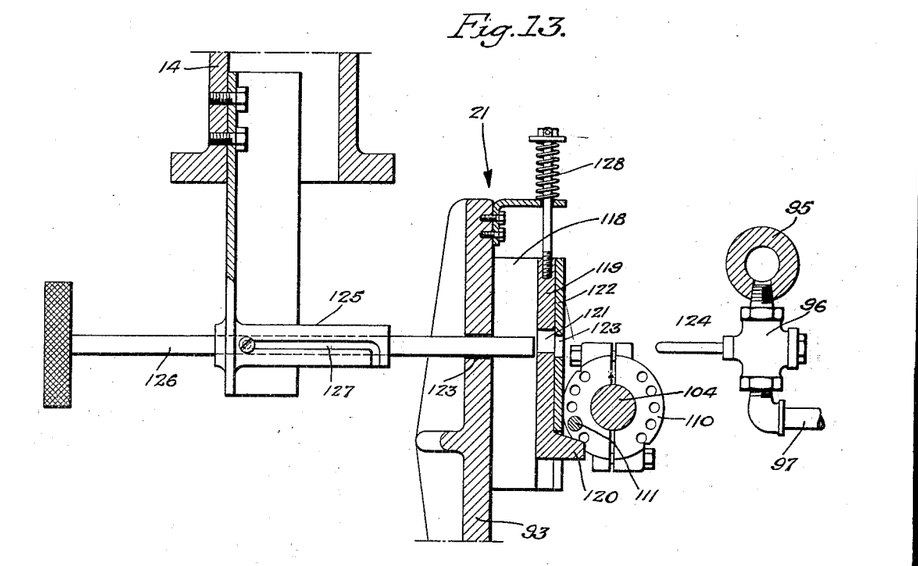
Fig. 13 is a section on line 13—13 of Fig. 2.
Figure 14:
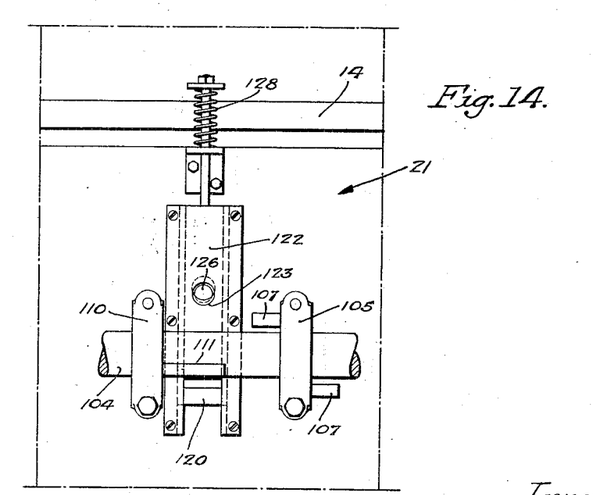
Fig. 14 is a rear elevation of the mechanism illustrated in Fig. 13.
Figure 15:
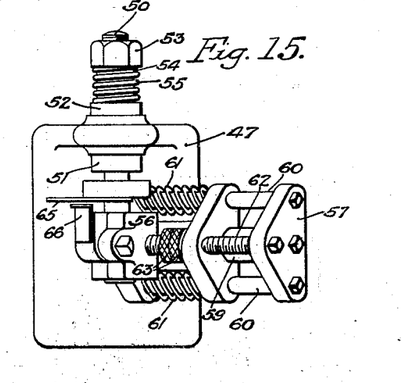
Fig. 15 is a plan view of the trimming mechanism.
Figure 16:
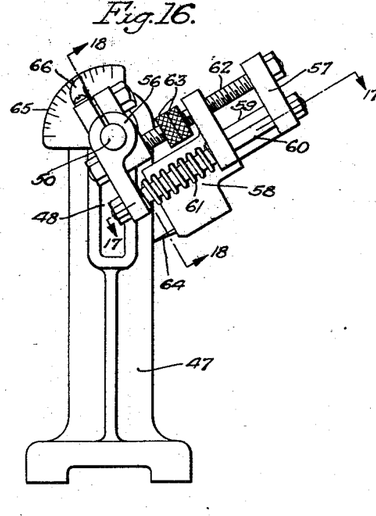
Fig. 16 is a front elevation thereof.
Figure 17:
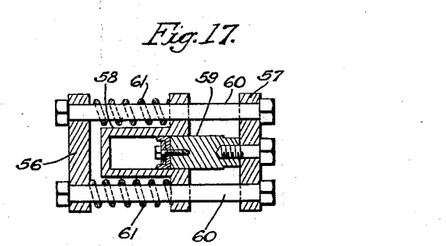
Fig. 17 is a section on line 17—17 of Fig. 16.
Figure 18:
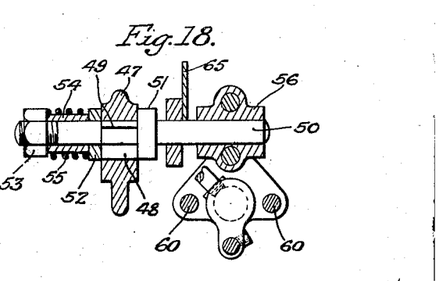
Fig. 18 is a section on line 18—18 of Fig. 16.

Rotatably mounted upon the panel adjacent the manifolds 95 and 101 and between the same is a shaft 104 bearing cams 105 each in the form of a split disc clamped upon the shaft and each having a plurality of openings 106 to interchangeably receive tappet pins 107. Associated with each cam 105 are a pair of rocker arms 108 and 109 to operate through the tappet pins 107, the associated throttle and exhaust valves 98 and 102, it being understood that each cam 105 controls one valve 98 and one valve 102. Adjacent the valve 96 the shaft has further secured thereto a cam 110, this cam having a single tappet pin 111, the purpose of which will hereinafter appear. Shaft 104 is driven at a desired speed from any suitable source at present indicated by input shaft 112 connected to the shaft 104 through speed changing gearing 113. It will, of course, be understood that the arrangement of cams 105 and of the pins carried by these cams will be such that the valves controlling the supply and exhaust of fluid pressure to the cylinders operating the several mechanisms mounted upon the lathe bed will be actuated in such timed relation that a predetermined sequence of operations will be performed.

The preferred sequence of operations is as follows: With the parts in the position shown in Fig. 1, in which the cylinder 75 is advanced toward an operator standing at the front of the machine, a cup packing is placed over the head 81, fluid pressure is admitted to cylinder 70 shifting the super-structure 69 toward the back of the machine and aligning the cylinder 75 with chuck 16. Fluid pressure is admitted to the cylinder 75 advancing the ram and causing the head to enter the chuck carrying with it the packing. While the head 81 is still engaged with the packing, fluid presure is admitted to cylinder 58 advancing the knife 64 and bringing the same into engagement with the packing to cut the bevel thereon. The fluid pressure is then released from cylinders 70, 75 and 58 and fluid pressure admitted to cylinder 71 moving the super-structure 69 toward the front of the machine until it comes into engagement with stops 88. Fluid pressure is then admitted to cylinder 76, advancing the cutter to form the opening in the bottom wall of the packing. During this period the operator has placed a second cup over the head 81; fluid pressure is then released from cylinders 76 and 71 and fluid pressure admitted to cylinder 23 advancing the ejector to cause ejection of the cup upon which the operations have just been performed. Admission of fluid pressure to cylinder 23 likewise admits fluid pressure to nozzles 114 and 115 mounted respectively upon the standard 47 and the super-structure 69 and directing blasts against the knife 64 and into the chuck 16 to clear the same of any cuttings. It will be noted from an inspection of Fig. 2 that the conduit 99 communicating with the cylinder 23 has branches 116 and 117 communicating with the nozzles 114 and 115. The cycle of operations just described is then repeated.

It will be obvious in interrupting these operations it will be substantially impossible for the operator to so time the checking of operation of shaft 104 and the cutting off of the fluid supply that there would be no drift of the shaft and corresponding displacement of timing of operations so that upon resumption of operations admission of fluid pressure to one or more of the devices might be improperly timed and, accordingly, cause damage to the machine. For example, if the operator cuts off the supply of fluid pressure to the machine at a time when ram 80 is engaged in the chuck 16, the drift of the shaft, or delay with any stopping operation of this shaft, might carry the cam mechanism to a point where, upon re-admission of fluid pressure, this fluid pressure would immediately enter cylinder 70, thus causing considerable damage to the machine.

I, therefore, provide the safety mechanism 21 more clearly shown in Figs. 2, 3, 13 and 14 which includes a vertically arranged guide 118 secured to the plate 93 adjacent the cam 110 and having disposed therein a vertically slidable guard plate 119 provided with a toe 120 disposed in the path of the pin 111 of cam 110 and having formed therein an opening 121. At the opposite side of the plate 93 from the guard plate I dispose a plate 122 and in the plate 93 and plate 122 I form openings 123 which align with the stem 124 of valve 96. Supported from the bed 14 is a tubular guide 125, the bore of which aligns with openings 123 and mounts a manually operable plunger 126 to engage the valve stem 124. The tubular guide 125 and the plunger 126 have a bayonet slot connection 127 permitting the plunger 126 to be locked in the position in which the stem of valve 96 is actuated to open the valve. Movement of this plunger to the valve actuating position is, however, prevented by reason of the fact that guard plate 119 is normally held in an elevated position through a spring 128. Assuming, then, that the operator attempts to supply fluid pressure to manifold 95 by actuation of plunger 126 without starting shaft 104, the plunger when forced rearwardly will engage against the guard plate 119 and the movement thereof will be checked before it can engage the valve stem 124. If, however, the shaft 104 is rotating, when the shaft rotates to a point such that pin 111 engages toe 120 shifting the plate 119 to align the aperture 121 with the plunger and with the openings 123, then the plunger may be moved rearwardly until it engages the stem and opens the valve and may be locked in this position. This can only occur at the time when the cams are positioned to begin the cycle of operations and it is, therefore, only necessary for the operator in beginning the operation of the machine to ascertain that the parts are in the position illustrated in Fig. 1. The elements thus described, therefore, comprise a means for synchronizing the admission of fluid pressure to the control system with the admission of fluid pressure through the control system to the first operating element of a series of elements adapted to perform in a predetermined cycle.

Since the construction hereinbefore set forth is capable of considerable range of change and modification without in any manner departing from the spirit of my invention, I do not wish to be understood as limiting myself thereto except as hereinafter claimed.

I claim:

1. The combination with a plurality of fluid-pressure-operated devices adapted for cyclical operation, fluid pressure distributing means for successively supplying fluid pressure to said devices and means for supplying fluid pressure to said distributing means including a valve, of means for actuating said valve to institute supply to the distributing means, means preventing operation of the valve operating means and means withdrawing said operation-preventing means when said distributing means is positioned for delivery of fluid pressure to the device first operated in the cycle.

2. The combination with a plurality of fluid-pressure-operated devices adapted for cyclical operation, fluid pressure distributing means for successively supplying fluid pressure to said devices including a cam shaft and a plurality of cams carried thereby and a valve controlling fluid pressure supply to said distributing means, of a plunger for actuating said valve, a member interposed between the plunger and valve and means for withdrawing said member when said shaft is in a predetermined position.

3. In apparatus for trimming and punching cup packings, a rotating chuck, a chucking means to receive the packing and place the same in the chuck, means for operating said chucking means, a knife to trim the packing, means for advancing the knife to engage and trim the packing while engaged in the chuck, cutting means for punching the packing while held in the chuck, means for operating said cutting means to punch the packing, and means to extract the trimmed and punched packing from the chuck.

4. In apparatus for trimming and punching cup packings, a rotating chuck, a chucking means to receive the packing and place the same in the chuck, means for operating said chucking means, a knife to trim the packing, means for advancing the knife to engage and trim the packing while engaged in the chuck, cutting means for punching the packing while held in the chuck, means for operating said cutting means to punch the packing, and means to extract the trimmed and punched packing from the chuck said chucking means and punching means being alternately alignable with the chuck.

5. In apparatus for trimming and punching cup packings a rotating chuck, a chucking means to receive the packing and place the same in the chuck, means for operating said chucking means, a knife to trim the packing, means for advancing the knife to engage and trim the packing while engaged in the chuck, cutting means for punching the packing while held in the chuck, means for operating said cutting means to punch the packing, means to extract the trimmed and punched packing from the chuck, said chucking means and punching means being alternately alignable with the chuck, and fluid-pressure operating means for alternately aligning said means with the chuck.

6. In apparatus for trimming and punching cup packings, a rotating chuck, chucking and holding means to receive a packing and place the same in a chuck and hold the packing in position in the chuck, a knife to trim the packing, means for advancing the knife to engage and trim the packing while held in the chuck by said chucking and holding means, means for withdrawing said chucking and holding means from the chuck, cutting means for punching the packing while held in the chuck, means for aligning said cutting means with the chuck and for moving it into engagement with the packing, and means to extract the punched packing from the chuck.

7. In apparatus of the character described, a support including end walls, a superstructure mounted for longitudinal reciprocation thereon and including cylinders opposing opposite end walls of said support, a piston for each cylinder and secured to the corresponding end wall of the support, a pair of transversely extending cylinders likewise included in said superstructure and opening through a common side thereof, pistons in said cylinders and projecting through the open ends thereof, and implements carried by said pistons.

8. In apparatus of the character described, a support including end walls, a superstructure mounted for longitudinal reciprocation thereon and including cylinders opposing opposite end walls of said support, a piston for each cylinder and secured to the corresponding end wall of the support, a pair of transversely extending cylinders likewise included in said superstructure and opening through a common side thereof, pistons in said cylinders and projecting through the open ends thereof, implements carried by said pistons, the pistons of the last-named cylinders having rods attached thereto and extending through the closed ends of the cylinders, spring means associated with said rods and compressed by projection of the pistons from the cylinders to store power to retract the pistons, and adjustable means for limiting movement of the rods to thereby limit extension of the cylinders.

9. In apparatus of the character described, a support including end walls, a superstructure mounted for longitudinal reciprocation thereon and including cylinders opposing opposite end walls of said support, a piston for each cylinder and secured to the corresponding end wall of the support, a pair of transversely extending cylinders likewise included in said superstructure and opening through a common side thereof, pistons in said cylinders and projecting through the open ends thereof, implements carried by said pistons, and adjustable means for limiting projection of the pistons of the last-named cylinders.

10. In apparatus of the character described, a support including end walls, a superstructure mounted for longitudinal reciprocation thereon and including cylinders opposing opposite end walls of said support, a piston for each cylinder and secured to the corresponding end wall of the support, a pair of transversely extending cylinders likewise included in said superstructure and opening through a common side thereof, pistons in said cylinders and projecting through the open ends thereof, implements carried by said pistons, and adjustable means limiting movement of the superstructure under influence of fluid pressure introduced to one of said cylinders.

11. In apparatus of the character described, a chuck, a hollow shaft mounting the chuck, an ejector tappet carried by the chuck and projecting into the hollow shaft, means for rotating the hollow shaft, a piston opposing an end of the hollow shaft, a rod slidably mounted in the hollow shaft engaging said piston with one end and said tappet at its opposite end, a slide mounting the piston, a cylinder in which the piston operates, means for introducing fluid pressure to said piston, a guide for the slide, and coacting means carried by said slide and guide for limiting movement of the piston.

12. In apparatus of the character described, a chuck, a hollow shaft mounting the chuck, an ejector tappet carried by the chuck and projecting into the hollow shaft, means for rotating the hollow shaft, a piston opposing an end of the hollow shaft, a rod slidably mounted in the hollow shaft engaging said piston with one end and said tappet at its opposite end, a slide mounting the piston, a cylinder in which the piston operates, means for introducing fluid pressure to said piston, a guide for the slide, coacting means carried by said slide and guide for limiting movement of the piston, comprising spaced ears carried by the guide, a threaded rod mounted therein, an ear carried by the slide and embracing said rod, and stop nuts mounted on said rod.

WILLIAM A. BOHNE.